(12) United States Patent
Sim (10) Patent No.: US 11,157,827 B2
(45) Date of Patent: Oct. 26, 2021

(54) HYBRID QUANTUM-CLASSICAL COMPUTER SYSTEM FOR PARAMETER-EFFICIENT CIRCUIT TRAINING

(71) Applicant: Zapata Computing, Inc., Boston, MA (US)

(72) Inventor: Sukin Sim, Cambridge, MA (US)

(73) Assignee: Zapata Computing, Inc., Boston, MA (US)

(*) Notice: Subject to any disclaimer, the term of this patent is extended or adjusted under 35 U.S.C. 154(b) by 0 days.

(21) Appl. No.: 17/084,990

(22) Filed: Oct. 30, 2020

(65) Prior Publication Data

US 2021/0133617 A1 May 6, 2021

Related U.S. Application Data

(60) Provisional application No. 62/927,826, filed on Oct. 30, 2019.

(51) Int. Cl.
*G06N 10/00* (2019.01)
*G06N 20/00* (2019.01)

(52) U.S. Cl.
CPC .............. *G06N 10/00* (2019.01); *G06N 20/00* (2019.01)

(58) Field of Classification Search
CPC ........ G06N 10/00; G06N 20/00; G06N 99/00; B82Y 10/00; G06F 7/544
USPC ........................................................... 706/12
See application file for complete search history.

(56) References Cited

U.S. PATENT DOCUMENTS

| 10,949,768 | B1* | 3/2021 | Zeng ....................... G06N 10/00 |
| 2016/0042294 | A1* | 2/2016 | Macready .............. G06N 10/00 706/10 |
| 2017/0351967 | A1 | 12/2017 | Babbush |
| 2019/0164079 | A1 | 5/2019 | Gambetta |

FOREIGN PATENT DOCUMENTS

| TW | 202123097 A | 6/2021 |
| WO | 2017001404 A1 | 1/2017 |
| WO | 2021087206 A1 | 5/2021 |

OTHER PUBLICATIONS

International Search Report & Written Opinion dated Feb. 18, 2021, in international patent application No. PCT/US2020/058119, 7 pages.
Sunkin Sim et al., "Expressibility and Entangling Capability of Parameterized Quantum Circuits for Hybrid Quantum-Classical Algorithms", arXiv:1905.10876v1, May 25, 2019, 18 pages. Available online at <URL: https://arxiv.org/abs/1905.10876v1.pdf>.
Dallaire-Demers, P.L., et al., "Low-depth circuit ansatz for preparing correlated fermionic states on a quantum computer". Quantum Physics, arXiv:1801.01053v1, pp. 1-15 (Jan. 3, 2018).
(Continued)

*Primary Examiner* — Dave Misir
(74) *Attorney, Agent, or Firm* — Blueshift IP LLC; Robert Plotkin (57) ABSTRACT

A method includes improved techniques for preparing the initial state of a quantum computer by reducing the number of redundant or unnecessary gates in a quantum circuit. Starting from an initial state preparation circuit ansatz, the method recursively removes gates and re-optimizes the circuit parameters to generate a reduced-depth state preparation.

30 Claims, 7 Drawing Sheets

(56) References Cited

OTHER PUBLICATIONS

Jones, T., and Benjamin, S.C., "Quantum compilation and circuit optimisation via energy dissipation" arXiv:1811.03147, pp. 1-13 (Dec. 19, 2018).
Mostafa, H., and Wang, X., et al., "Parameter Efficient Training of Deep Convolutional Neural Networks by Dynamic Sparse Reparameterization", arXiv:1902.05967v3, pp. 1-18 (May 13, 2019).

* cited by examiner

HYBRID QUANTUM-CLASSICAL COMPUTER SYSTEM FOR PARAMETER-EFFICIENT CIRCUIT TRAINING

BACKGROUND

Initial state preparation can be a challenging task for near-term quantum computers, in which relatively low circuit depth is the primary hurdle for useful quantum protocols. Because quantum gates are inherently noisy, improvements in near-term algorithms typically involve simply reducing the gate depth of a desired operation or a variational ansatz. For instance, algorithms such as Variational Quantum Eigensolver (VQE) try to prepare approximate ground states of a molecular electronic Hamiltonian, but the size of the system they can simulate and the accuracy of the simulation is directly tied to the depth of the corresponding circuit ansatz.

What is needed, therefore, are improvements in initial state preparation for quantum computers, particularly NISQ (noisy intermediate-scale quantum) computers.

SUMMARY

A method includes improved techniques for preparing the initial state of a quantum computer by reducing the number of redundant or unnecessary gates in a quantum circuit. Starting from an initial state preparation circuit ansatz, the method recursively removes gates and re-optimizes the circuit parameters to generate a reduced-depth state preparation.

In one aspect, a method for generating a reduced-depth quantum circuit for preparing a state of a quantum computer includes receiving, as input, a first variational quantum circuit adapted to prepare an initial state of the quantum computer, the first circuit having a first depth D1 and an associated first cost function value C1. The method includes generating, based on the first circuit, a second circuit having a second depth D2 and associated cost function value C2, wherein D2<=D1 and C2−C1<ε, where ε is the maximum additional cost one is willing to incur for a reduced-depth state preparation.

In another aspect, a hybrid quantum device includes both a classical computer component and a quantum computer component. A method improves a tunable quantum evolution with respect to an objective function. Embodiments may include first selecting, on a classical computer, a subset S of the parameters whose values describe tunable components of the tunable quantum evolution. The number of non-trivial operations in the quantum evolution is then reduced based on a dropped subset $P_d$ of P, wherein the subset S and the subset $P_d$ are disjoint. Tuning of the subset S is then performed on a quantum computer with respect to the objective function.

The generating of the second circuit includes removing some variational circuit components from the first circuit, and then optimizing, by minimizing the cost function, the remaining variational components of the circuit.

Other features and advantages of various aspects and embodiments of the present invention will become apparent from the following description and from the claims.

BRIEF DESCRIPTION OF THE DRAWINGS

This invention is described with particularity in the appended claims. The above and further aspects of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In one aspect, a hybrid quantum device includes both a classical computer component and a quantum computer component. A method improves a tunable quantum evolution with respect to an objective function. Embodiments may include first selecting, on a classical computer, a subset S of the parameters whose values describe tunable components of the tunable quantum evolution. The number of non-trivial operations in the quantum evolution is then reduced based on a dropped subset $P_d$ of P, wherein the subset S and the subset $P_d$ are disjoint. Tuning of the subset S is then performed on a quantum computer with respect to the objective function.

Figure 3:
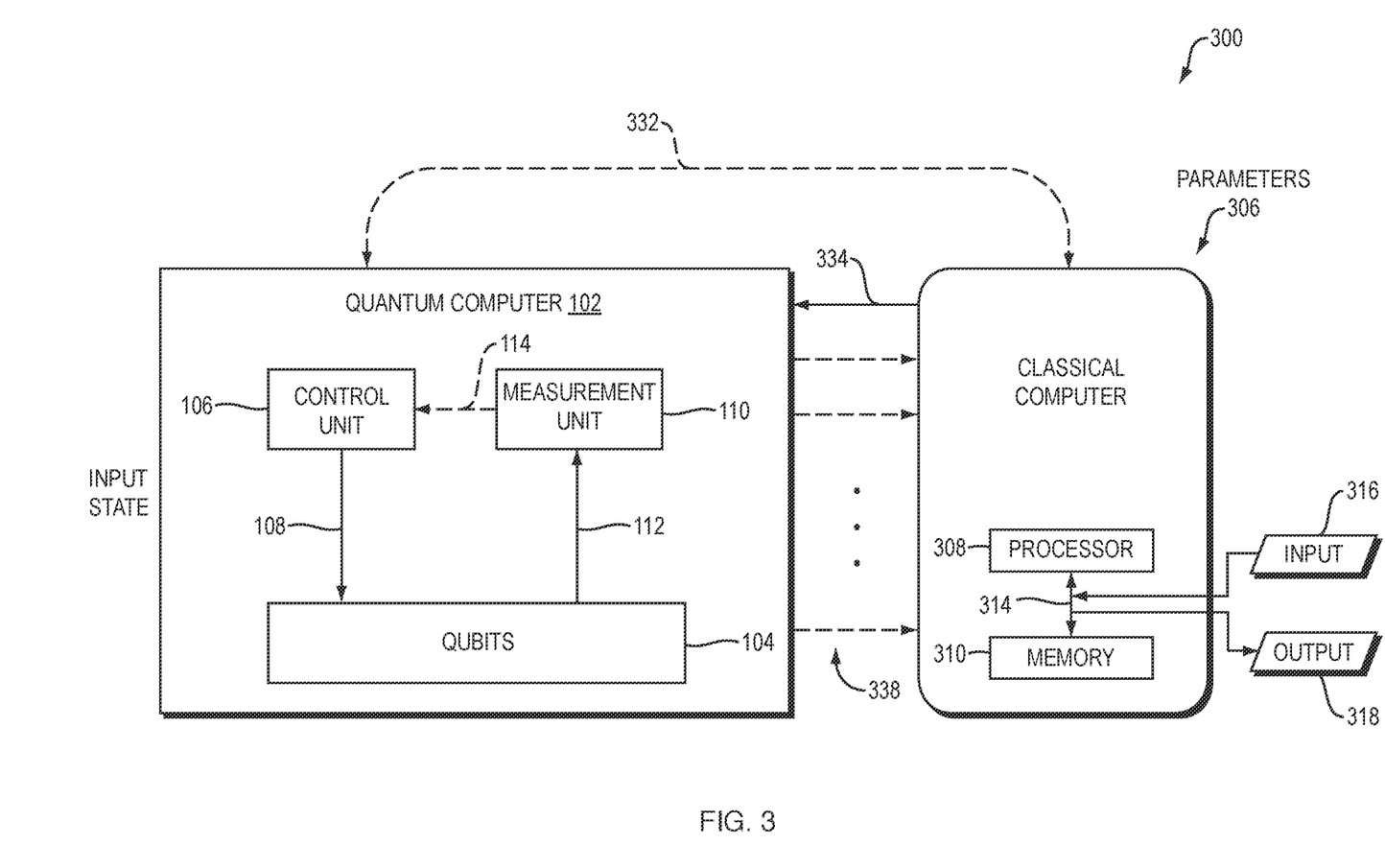
FIG. 3 is a diagram of a hybrid quantum-classical computer system implemented according to one embodiment of the present invention.
Figure 4:
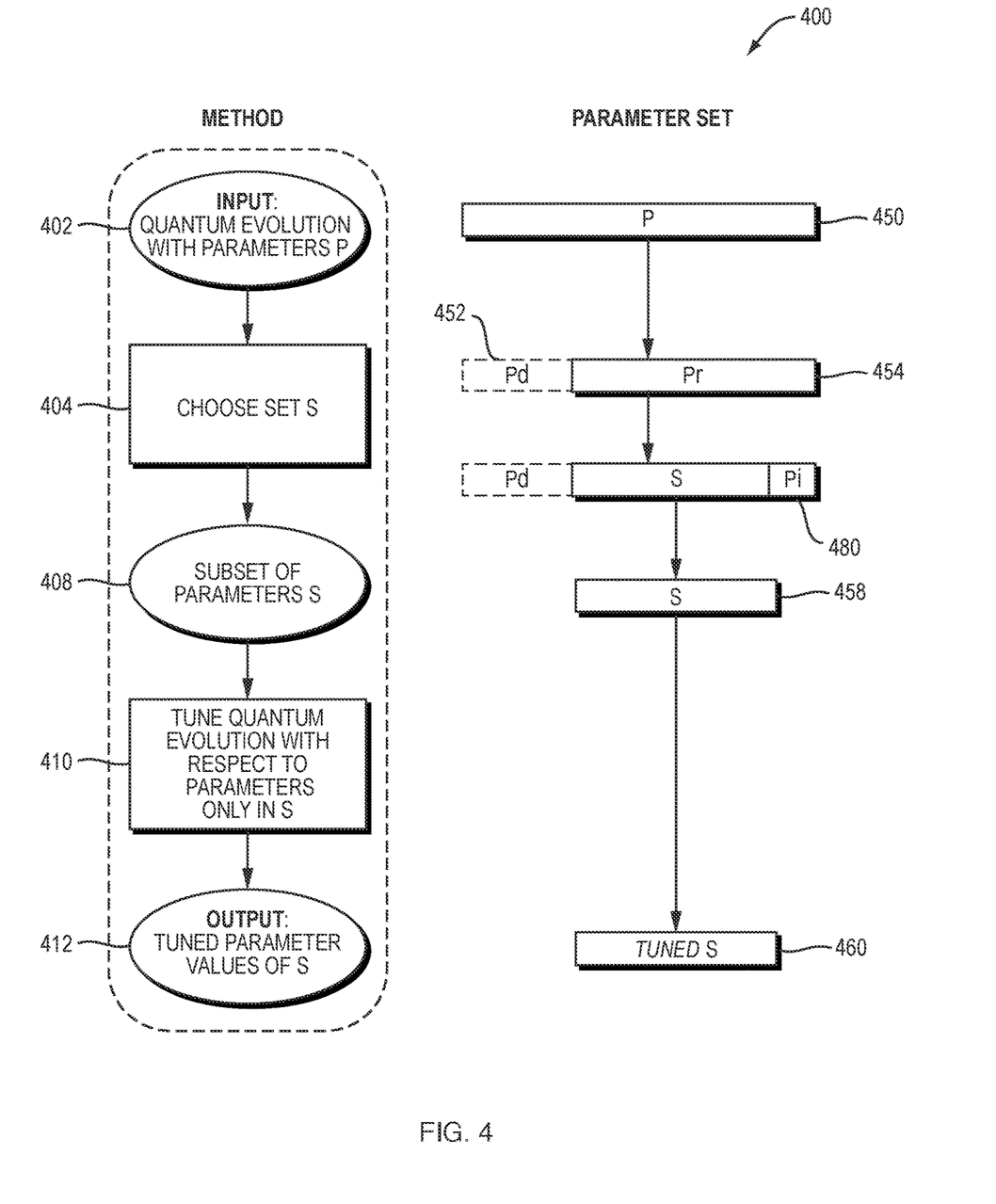
FIGS. 4-6 are flowcharts of methods performed by embodiments of the present invention to perform parameter-efficient circuit training for a quantum computer.

Referring to FIG. 4, a flowchart is shown of a method 400 performed by a hybrid quantum-classical computer according to one embodiment of the present invention. The hybrid quantum-classical computer may be implemented in any of the ways disclosed herein (such as in the ways shown in FIGS. 1 and 3), and may include both a classical computer and a quantum computer. Assume that a quantum evolution may be described as a combination of controllable and fixed operations, and that each of the controllable operations may be described by one or more corresponding tunable parameters P 450 that define the operation. Furthermore, assume for purposes of example that each of the operations has a relative ordering (in time of execution) with respect to the other operations in the overall sequence, and that each of the parameters P 450, therefore, also has a relative ordering (in time of execution) with respect to the other parameters in P 450.

The method 400 receives as input, at the classical computer, the set of parameters P 450 (FIG. 4, operation 402). Let n be the number of parameters P 450 in the following description, where n>1, and typically n>>1. Note that the parameters P 450 may be a subset of a larger set of parameters (not shown). Therefore, the parameters P 450 in FIG. 4 denote the parameters that are operated on by the method 400 of FIG. 4.

Figure 5:
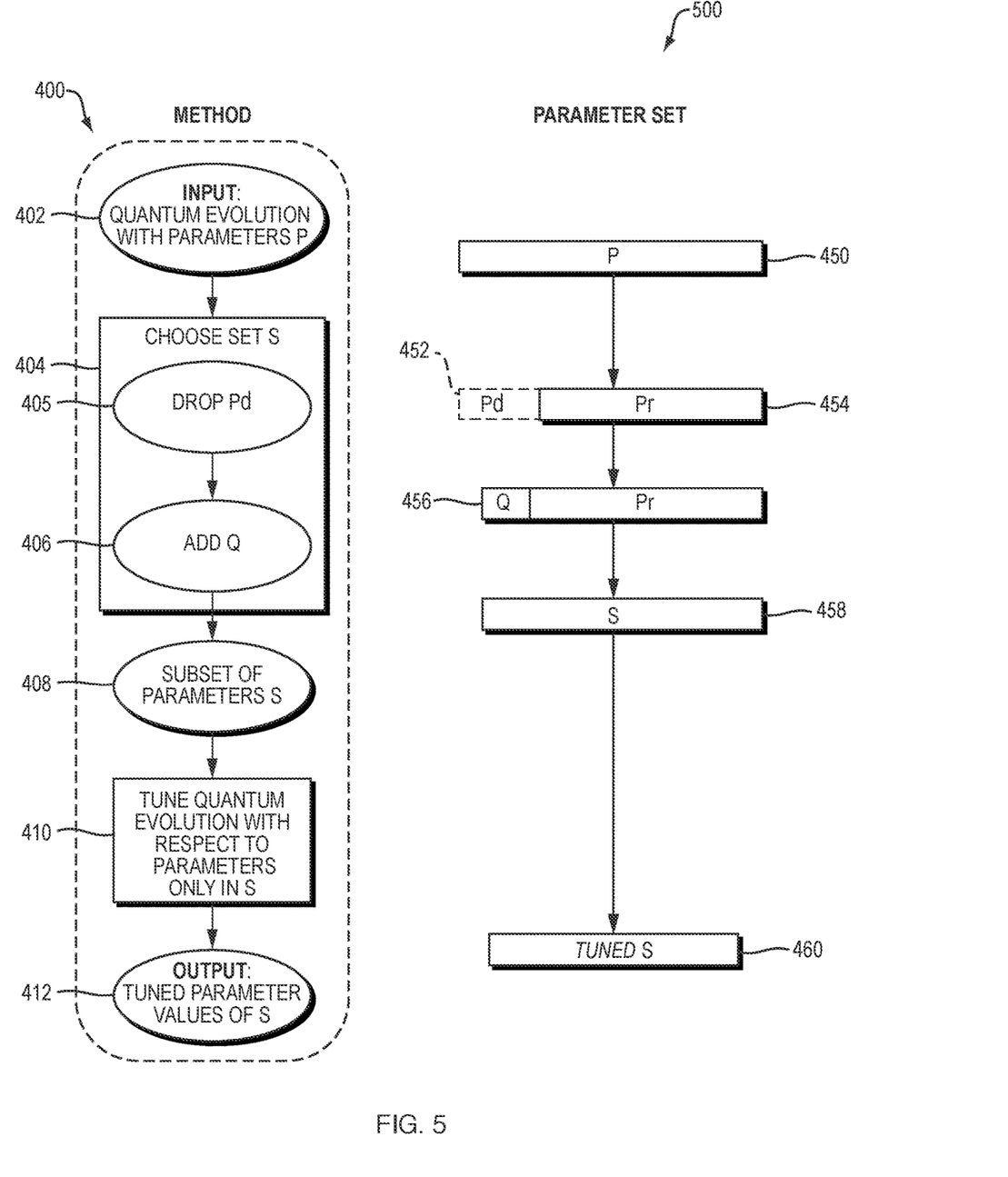

The method 400 (e.g., the classical computer) chooses a subset S 458 of the set P 450 (operation 404). The method 400 may choose the subset S 458 in any of a variety of ways, such as in the way shown in the method 500 of FIG. 5, in which the classical computer removes a subset of parameters $P_{dropped}$ 452 from the set P 450 based on some defined criteria (FIG. 5, operation 405). The resulting residual subset of P 450 (i.e., P 450-$P_{dropped}$ 452) is referred to herein as subset $P_{residual}$ 454. The resulting quantum evolution is described only by the residual parameter subset S 458. The parameter subset $P_{dropped}$ 452 may be "removed" by, for example: (1) setting each of the parameters in $P_{dropped}$ 452 to a value such that the parameter's corresponding operation is the trivial operation (identity), (2) setting each of the parameters in $P_{dropped}$ 452 to zero, or (3) in quantum annealing, removing the step associated with the parameters $P_{dropped}$ from the annealing schedule. Regardless of the particular method that is used to remove the parameter subset $P_{dropped}$, the effect of removing them is to reduce the number of non-trivial operations in the quantum evolution. Note that $P_{residual}$ 454 may contain a subset of parameters $P_{ignore}$ 480, which remain a part of the quantum evolution but are not in the subset S 458 and hence are not tuned according to the tuning operation 410.

The method 500 may, for example, at the classical computer, add, from the set of parameters P 450, zero or more parameters Q 456 to the residual set $P_{residual}$ 454, such that the quantum evolution is described by the union of the residual subset $P_{residual}$ 454 and the added parameters Q 456 (FIG. 5, operation 406). Note that operation 406 is optional and may be omitted from the method 500. For example, in the case in which operation 406 adds zero parameters, operation 406 may instead merely be omitted from the method 400. Operation 406 may select the added parameters Q 456 in any of a variety of ways, such as by selecting the parameters Q 456 from: (1) the set P, or (2) a set of available parameters (and their corresponding operations) that are not in P. The resulting S 458 may be obtained by taking the union of $P_{residual}$ and Q, namely by S=$P_{residual}$ ∪ Q (FIG. 4, operation 408).

In some embodiments, a fixed sparsity value F, representing a fraction of the number of parameters in the original set P 450, may be chosen. The operations 404 and 406 may then be constrained to update the set S such that F=|S|/|P|.

The method 400 uses both the classical computer and the quantum computer to tune the quantum evolution that is described by the values of parameters in the set S 458 (FIG. 4, operation 410). The parameters in set S 458 may be tuned, for example, by first applying the quantum evolution and then measuring (using the quantum computer) one or more qubits, and using these measurements to compute (using the classical computer) a cost function or objective function, followed by changing (using the classical computer) the values of the parameters in S 458, and then again applying the quantum evolution, measuring (using the quantum computer) the same qubit(s), and recomputing (using the classical computer) the cost function to minimize or maximize the cost function or objective function. Examples of such an optimization are: (1) tuning the evolution to minimize the expectation value of an energy eigenfunction; (2) maximizing the fidelity for a prepared quantum state to match a target quantum state; (3) minimizing the Kullback-Leibler divergence between a trial distribution, which is the result of measuring the output quantum state, and a target distribution. Examples of optimization techniques for performing the tuning in operation 410 are: (1) gradient-based methods such as BFGS or conjugate-gradient method; (2) gradient-free methods such as COBYLA or Bayesian optimization.

After tuning the quantum evolution with respect to parameter set S 458, the method 400 outputs a description 460 of the quantum evolution that is controlled by parameters in set S 458, in which the values of these parameters have been tuned (FIG. 4, operation 412).

Certain operations of the method 500 of FIG. 5 were described above. Operations 402, 408, 410, and 412 in the method 500 of FIG. 5 are identical to those operations in the method 400 of FIG. 4 and, as a result, are not described separately herein.

Figure 6:
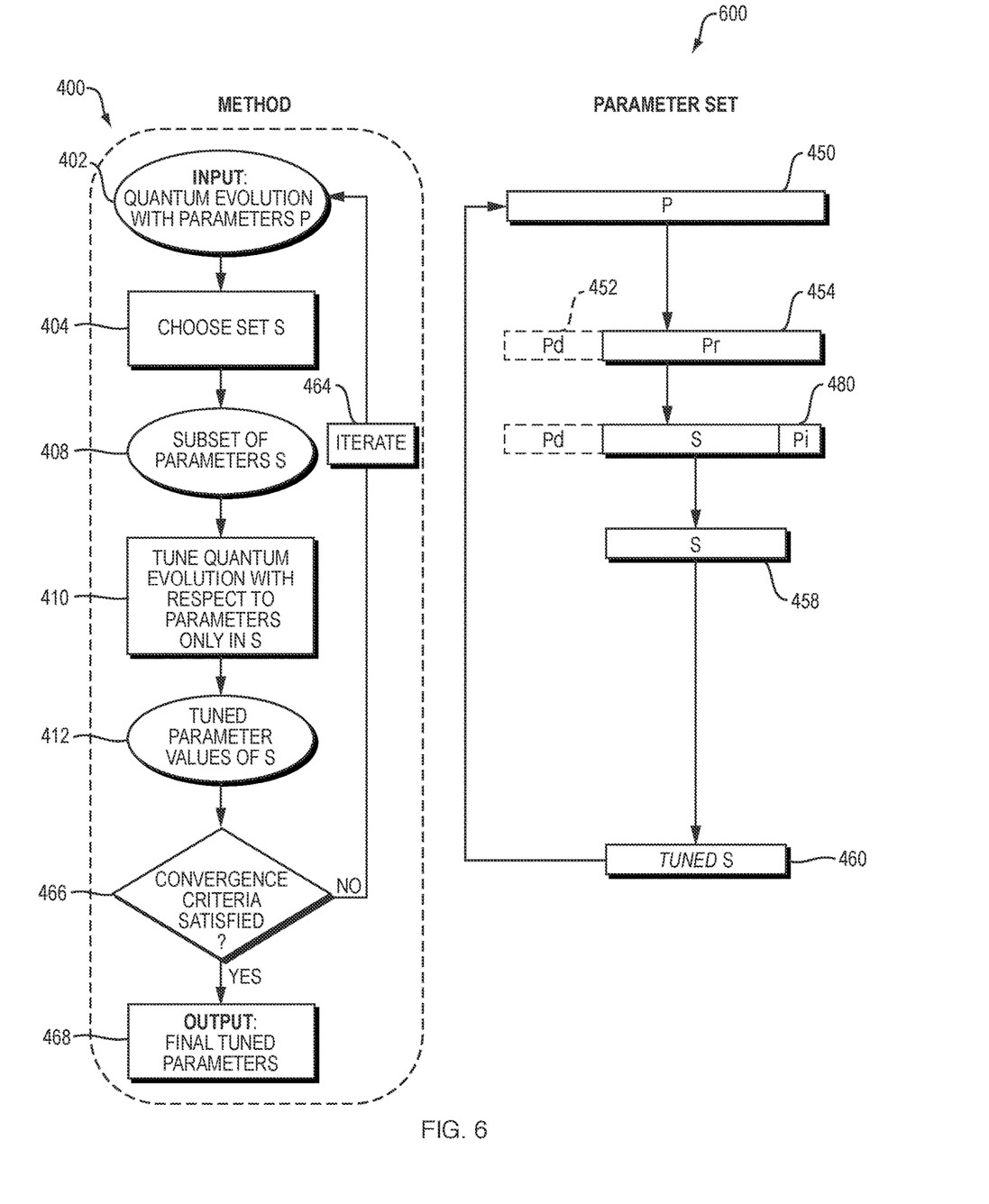

Similarly, FIG. 6 is a flowchart of a method 600 that is performed by certain embodiments of the present invention. Operations 402, 404, 408, 410, and 412 in the method 600 of FIG. 6 are identical to those operations in the method 400 of FIG. 4 and, as a result, are not described separately herein. In addition, the method 600 feeds back the tuned parameter set S 460 into operation 404 as the new input into operation 404 (i.e., S←P) (FIG. 6, operation 464). The method 600 also feeds back data D from previous iteration(s) of the method 600 into operations 404 and 406, which may use the data D in parameter deletion (operation 404) and parameter addition (operation 406). The data D may include any of a variety of data obtained from previous iterations of the method 600. For example, the data D may include data identifying one or more parameters, from the k most recent iterations (where k>=1) of the method 600, having values that fall below a particular parameter magnitude threshold (in which the value of the parameter magnitude threshold itself may be updated by data from previous iterations), in which case the method 600 may delete such parameters identified by the data D in the next iteration of operation 404. As another example, the data D may indicate the relative importance of different parts of the quantum evolution, in which case the method 600 may add one or more parameters based on that relative importance in the next iteration of operation 406. The importance of a part of the quantum evolution may, for example, be quantified by the number of parameters that were retained (i.e., not deleted) in one or more previous iterations of the method 600.

In one embodiment, the sparsity parameter F may be used to constrain the number of parameters in the set S for every iteration.

In one embodiment, a quantum circuit may be broken up into several layers. Each parameter of the set S may correspond to a gate in a given layer. Since operations in some layers may influence the cost function more than operations in other layers, the data D may be used to identify which layers are more influential in the optimization. In such a case, removing parameters from layers which are deemed less important may be prioritized.

In some embodiments, the quantum evolution consists of a variational circuit which has a layered circuit ansatz in which the set S may be chosen to coincide with one or more layers of the given ansatz. In embodiments with iteration, the iterative subsets may be chosen to sequentially coincide with sequential layers of the circuit ansatz.

In another embodiment, the previous values of the cost function may be used for simulated annealing. More concretely, if the cost function value after an update to the parameter set S is higher than that of the previous iteration, the update may be probabilistically accepted according to the Metropolis criterion.

Operations 404-412 of the method 600 may repeat any number of times in the manner described above. After each iteration, the method may determine whether a convergence or termination criterion has been satisfied (FIG. 6, operation 466). If the convergence or termination criterion has not been satisfied, then the method 600 iterates again over operations 402-412 (operation 464). If the convergence or termination criterion has been satisfied, then the method 600 terminates and outputs the final tuned parameters (operation 468).

The convergence or termination criterion may for example, be or include any one or more of the following: (1) the improvement in objective function value over last b iterations falls within some tolerance (where b>=1), (2) the objective function value reaches, within some precision, the optimal objective function value, if known, and (3) the number of function evaluations reaches some maximum value. Regardless of the particular convergence or termination criterion that is used, once that criterion is satisfied, the method 500 outputs the latest iteration of S as the output of the method 500 (FIG. 5, operation 468).

One embodiment of the present invention is directed to a method for improving, on a hybrid quantum-classical computer, a tunable quantum evolution with respect to an objective function. The tunable quantum evolution has a number of non-trivial operations. The method includes: (A) selecting, on a classical computer, a subset S of a first set P of parameters whose values describe tunable components of the tunable quantum evolution; (B) reducing, on the classical computer, the number of non-trivial operations in the quantum evolution based on a subset $P_d$ in the first set P of parameters that are not in the subset S, wherein $P_d$ is a complement of S with respect to P; and (C) tuning, on a quantum computer, the subset S of the first set P of parameters with respect to the objective function, thereby producing a set of tuned values of the subset S which, when the objective function is evaluated with respect to the set of tuned values of the subset S, produces a tuned value of the objective function.

The operation (B) may include any one or more of the following: (1) assigning, to each of the parameters in the subset $P_d$, a value such that the parameters in the subset $P_d$ correspond to trivial operations; (2) setting values of each of the parameters in the subset $P_d$ to zero; and (3) removing, from a quantum annealing process, a step associated with the subset $P_d$ from an annealing schedule.

The method may include adding a new parameter to the subset S before (C). Adding the new parameter may include adding the new parameter from the first set of parameters. The method may further include iteratively performing (A)-(C) in a plurality of iterations, with each of a plurality of subsets of P acting as the subset S in a sequence until a desired constraint on the objective function is achieved.

The method may further include iteratively performing (A)-(C) in a plurality of iterations, with each of a plurality of subsets of P acting as the subset S in a sequence until a desired constraint on the objective function is achieved. The number of parameters of each of the plurality of subsets may be equal across all iterations. Each of the plurality of iterations in the sequence may result in a corresponding tuned value $V_i$ of the objective function, and wherein the tuned value $V_n$ is input into iteration $V_{n+1}$ of (A)-(C). Tuned values of the plurality of subsets of P may be input into subsequent iterations.

The number of parameters of the subset S may be chosen according to a given fraction of the number of parameters in the first set of parameters. The tuning may constitute or include simulated annealing based on the objective function. Selecting the subset S may include selecting parameters in a layer of a layered circuit ansatz.

The method may further include: (D) evaluating the objective function with respect to the set of tuned values of the subset S to produce the tuned value of the objective function.

Another embodiment of the present invention is directed to a system for improving, on a hybrid quantum-classical computer, a tunable quantum evolution with respect to an objective function. The tunable quantum evolution has a number of non-trivial operations. The system includes a non-transitory computer-readable medium having computer program instructions stored thereon. The hybrid quantum-classical computer includes a classical computer and a quantum computer, the computer program instructions being executable by at least one processor in the classical computer to perform a method. The method may be any of the methods disclosed herein.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Various physical embodiments of a quantum computer are suitable for use according to the present disclosure. In general, the fundamental data storage unit in quantum computing is the quantum bit, or qubit. The qubit is a quantum-computing analog of a classical digital computer system bit. A classical bit is considered to occupy, at any given point in time, one of two possible states corresponding to the binary digits (bits) 0 or 1. By contrast, a qubit is implemented in hardware by a physical medium with quantum-mechanical characteristics. Such a medium, which physically instantiates a qubit, may be referred to herein as a "physical instantiation of a qubit," a "physical embodiment of a qubit," a "medium embodying a qubit," or similar terms, or simply as a "qubit," for ease of explanation. It should be understood, therefore, that references herein to "qubits" within descriptions of embodiments of the present invention refer to physical media which embody qubits.

Each qubit has an infinite number of different potential quantum-mechanical states. When the state of a qubit is physically measured, the measurement produces one of two different basis states resolved from the state of the qubit. Thus, a single qubit can represent a one, a zero, or any quantum superposition of those two qubit states; a pair of qubits can be in any quantum superposition of 4 orthogonal basis states; and three qubits can be in any superposition of 8 orthogonal basis states. The function that defines the quantum-mechanical states of a qubit is known as its wavefunction. The wavefunction also specifies the probability distribution of outcomes for a given measurement. A qubit, which has a quantum state of dimension two (i.e., has two orthogonal basis states), may be generalized to a d-dimensional "qudit," where d may be any integral value, such as 2, 3, 4, or higher. In the general case of a qudit, measurement of the qudit produces one of d different basis states resolved from the state of the qudit. Any reference herein to a qubit should be understood to refer more generally to a d-dimensional qudit with any value of d.

Although certain descriptions of qubits herein may describe such qubits in terms of their mathematical properties, each such qubit may be implemented in a physical medium in any of a variety of different ways. Examples of such physical media include superconducting material, trapped ions, photons, optical cavities, individual electrons trapped within quantum dots, point defects in solids (e.g., phosphorus donors in silicon or nitrogen-vacancy centers in diamond), molecules (e.g., alanine, vanadium complexes), or aggregations of any of the foregoing that exhibit qubit behavior, that is, comprising quantum states and transitions therebetween that can be controllably induced or detected.

For any given medium that implements a qubit, any of a variety of properties of that medium may be chosen to implement the qubit. For example, if electrons are chosen to implement qubits, then the x component of its spin degree of freedom may be chosen as the property of such electrons to represent the states of such qubits. Alternatively, the y component, or the z component of the spin degree of freedom may be chosen as the property of such electrons to represent the state of such qubits. This is merely a specific example of the general feature that for any physical medium that is chosen to implement qubits, there may be multiple physical degrees of freedom (e.g., the x, y, and z components in the electron spin example) that may be chosen to represent 0 and 1. For any particular degree of freedom, the physical medium may controllably be put in a state of superposition, and measurements may then be taken in the chosen degree of freedom to obtain readouts of qubit values.

Certain implementations of quantum computers, referred as gate model quantum computers, comprise quantum gates. In contrast to classical gates, there is an infinite number of possible single-qubit quantum gates that change the state vector of a qubit. Changing the state of a qubit state vector typically is referred to as a single-qubit rotation, and may also be referred to herein as a state change or a single-qubit quantum-gate operation. A rotation, state change, or single-qubit quantum-gate operation may be represented mathematically by a unitary 2×2 matrix with complex elements. A rotation corresponds to a rotation of a qubit state within its Hilbert space, which may be conceptualized as a rotation of the Bloch sphere. (As is well-known to those having ordinary skill in the art, the Bloch sphere is a geometrical representation of the space of pure states of a qubit.) Multi-qubit gates alter the quantum state of a set of qubits. For example, two-qubit gates rotate the state of two qubits as a rotation in the four-dimensional Hilbert space of the two qubits. (As is well-known to those having ordinary skill in the art, a Hilbert space is an abstract vector space possessing the structure of an inner product that allows length and angle to be measured. Furthermore, Hilbert spaces are complete: there are enough limits in the space to allow the techniques of calculus to be used.)

A quantum circuit may be specified as a sequence of quantum gates. As described in more detail below, the term "quantum gate," as used herein, refers to the application of a gate control signal (defined below) to one or more qubits to cause those qubits to undergo certain physical transformations and thereby to implement a logical gate operation. To conceptualize a quantum circuit, the matrices corresponding to the component quantum gates may be multiplied together in the order specified by the gate sequence to produce a 2n×2n complex matrix representing the same overall state change on n qubits. A quantum circuit may thus be expressed as a single resultant operator. However, designing a quantum circuit in terms of constituent gates allows the design to conform to a standard set of gates, and thus enable greater ease of deployment. A quantum circuit thus corresponds to a design for actions taken upon the physical components of a quantum computer.

A given variational quantum circuit may be parameterized in a suitable device-specific manner. More generally, the quantum gates making up a quantum circuit may have an associated plurality of tuning parameters. For example, in embodiments based on optical switching, tuning parameters may correspond to the angles of individual optical elements.

In certain embodiments of quantum circuits, the quantum circuit includes both one or more gates and one or more measurement operations. Quantum computers implemented using such quantum circuits are referred to herein as implementing "measurement feedback." For example, a quantum computer implementing measurement feedback may execute the gates in a quantum circuit and then measure only a subset (i.e., fewer than all) of the qubits in the quantum computer, and then decide which gate(s) to execute next based on the outcome(s) of the measurement(s). In particular, the measurement(s) may indicate a degree of error in the gate operation(s), and the quantum computer may decide which gate(s) to execute next based on the degree of error. The quantum computer may then execute the gate(s) indicated by the decision. This process of executing gates, measuring a subset of the qubits, and then deciding which gate(s) to execute next may be repeated any number of times. Measurement feedback may be useful for performing quantum error correction, but is not limited to use in performing quantum error correction. For every quantum circuit, there is an error-corrected implementation of the circuit with or without measurement feedback.

Some embodiments described herein generate, measure, or utilize quantum states that approximate a target quantum state (e.g., a ground state of a Hamiltonian). As will be appreciated by those trained in the art, there are many ways to quantify how well a first quantum state "approximates" a second quantum state. In the following description, any concept or definition of approximation known in the art may be used without departing from the scope hereof. For example, when the first and second quantum states are represented as first and second vectors, respectively, the first quantum state approximates the second quantum state when an inner product between the first and second vectors (called the "fidelity" between the two quantum states) is greater than a predefined amount (typically labeled ∈). In this example, the fidelity quantifies how "close" or "similar" the first and second quantum states are to each other. The fidelity represents a probability that a measurement of the first quantum state will give the same result as if the measurement were performed on the second quantum state. Proximity between quantum states can also be quantified with a distance measure, such as a Euclidean norm, a Hamming distance, or another type of norm known in the art. Proximity between quantum states can also be defined in computational terms. For example, the first quantum state approximates the second quantum state when a polynomial time-sampling of the first quantum state gives some desired information or property that it shares with the second quantum state.

Not all quantum computers are gate model quantum computers. Embodiments of the present invention are not limited to being implemented using gate model quantum computers. As an alternative example, embodiments of the present invention may be implemented, in whole or in part, using a quantum computer that is implemented using a quantum annealing architecture, which is an alternative to the gate model quantum computing architecture. More specifically, quantum annealing (QA) is a metaheuristic for finding the global minimum of a given objective function over a given set of candidate solutions (candidate states), by a process using quantum fluctuations.

Figure 2A:
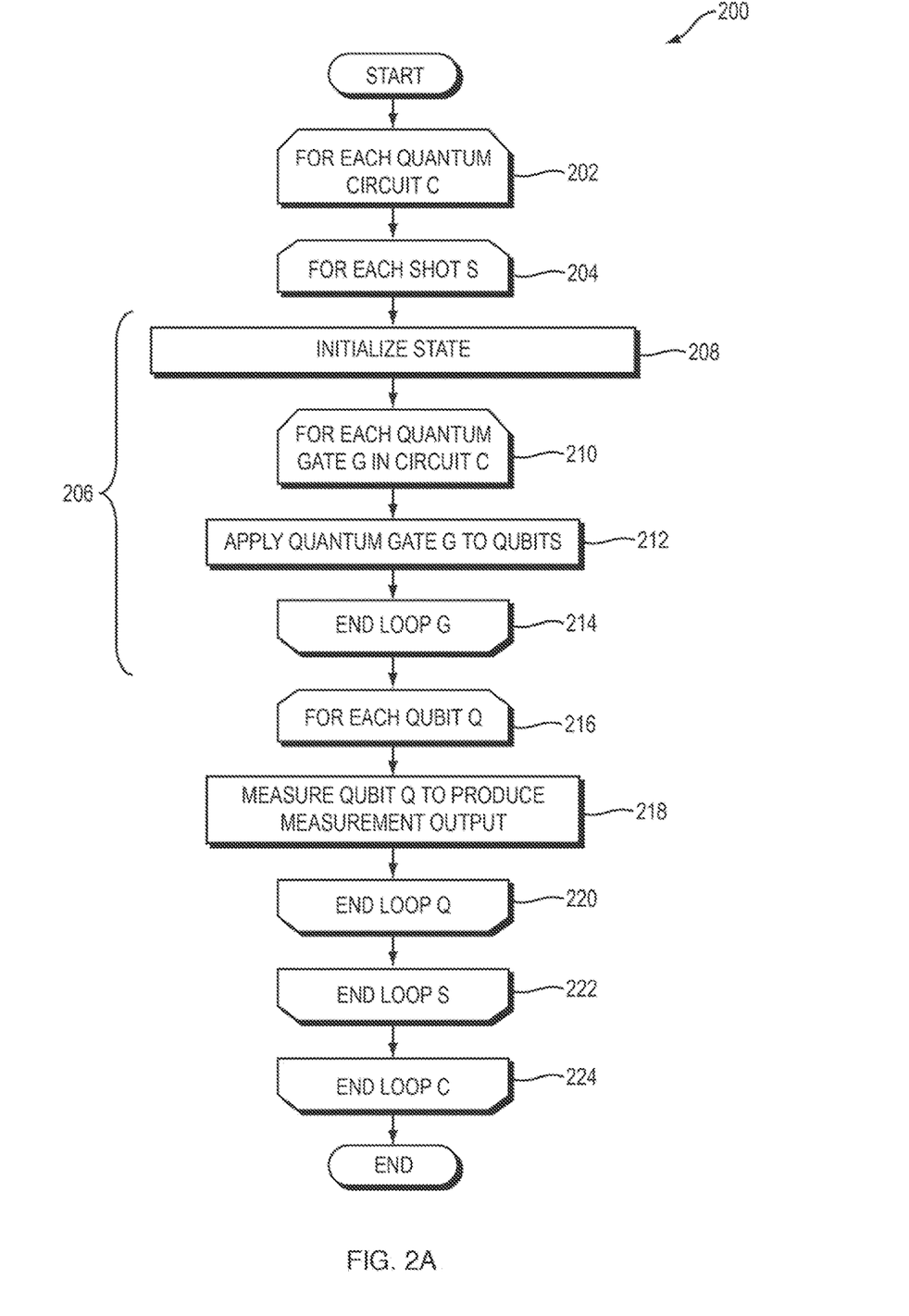
FIG. 2A is a flow chart of a method performed by the system of FIG. 1 according to one embodiment of the present invention.
Figure 2B:
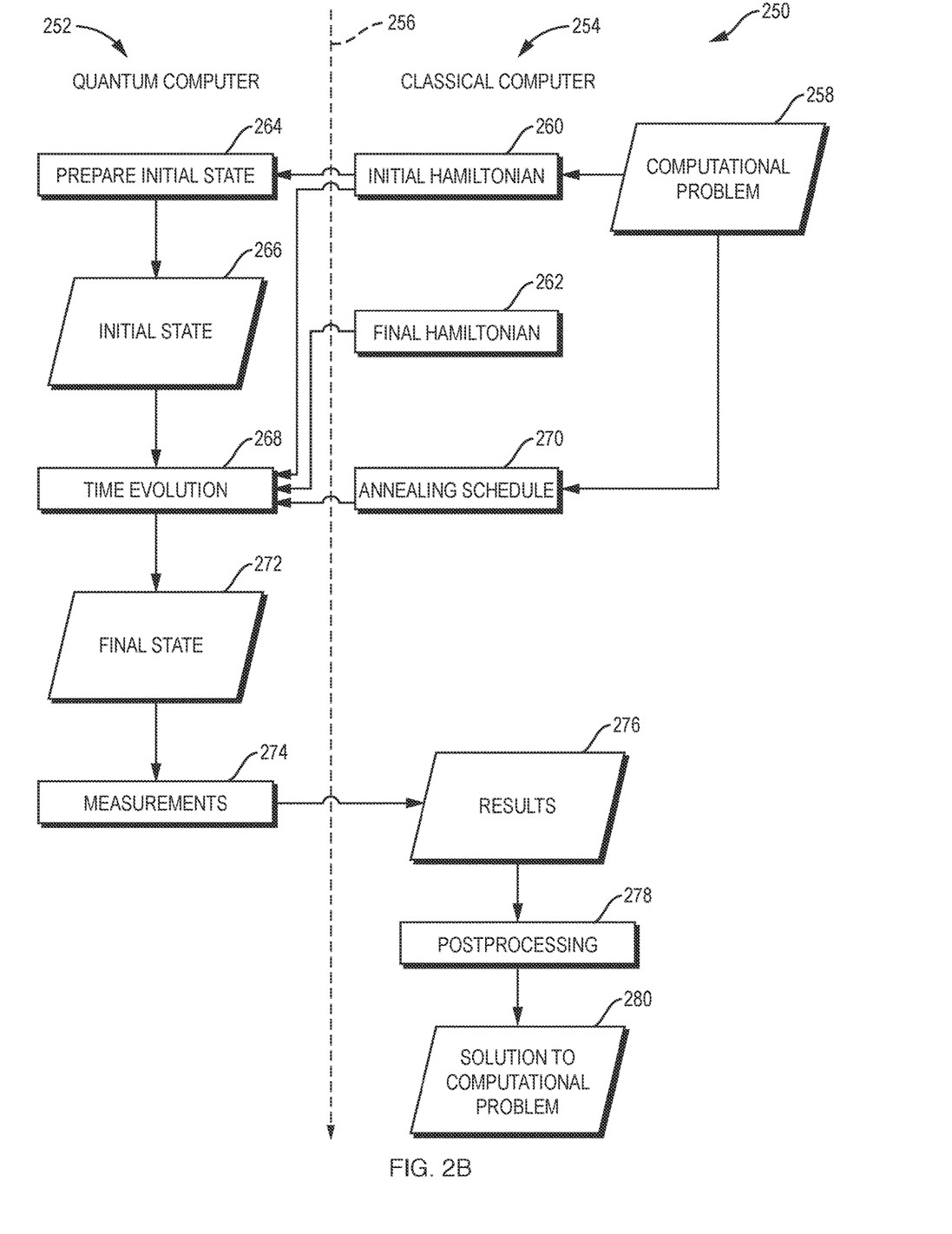
FIG. 2B is a diagram illustrating operations typically performed by a computer system which implements quantum annealing.

FIG. 2B shows a diagram illustrating operations typically performed by a computer system 250 which implements quantum annealing. The system 250 includes both a quantum computer 252 and a classical computer 254. Operations shown on the left of the dashed vertical line 256 typically are performed by the quantum computer 252, while operations shown on the right of the dashed vertical line 256 typically are performed by the classical computer 254.

Quantum annealing starts with the classical computer 254 generating an initial Hamiltonian 260 and a final Hamiltonian 262 based on a computational problem 258 to be solved, and providing the initial Hamiltonian 260, the final Hamiltonian 262 and an annealing schedule 270 as input to the quantum computer 252. The quantum computer 252 prepares a well-known initial state 266 (FIG. 2B, operation 264), such as a quantum-mechanical superposition of all possible states (candidate states) with equal weights, based on the initial Hamiltonian 260. The classical computer 254 provides the initial Hamiltonian 260, a final Hamiltonian 262, and an annealing schedule 270 to the quantum computer 252. The quantum computer 252 starts in the initial state 266, and evolves its state according to the annealing schedule 270 following the time-dependent Schrödinger equation, a natural quantum-mechanical evolution of physical systems (FIG. 2B, operation 268). More specifically, the state of the quantum computer 252 undergoes time evolution under a time-dependent Hamiltonian, which starts from the initial Hamiltonian 260 and terminates at the final Hamiltonian 262. If the rate of change of the system Hamiltonian is slow enough, the system stays close to the ground state of the instantaneous Hamiltonian. If the rate of change of the system Hamiltonian is accelerated, the system may leave the ground state temporarily but produce a higher likelihood of concluding in the ground state of the final problem Hamiltonian, i.e., diabatic quantum computation. At the end of the time evolution, the set of qubits on the quantum annealer is in a final state 272, which is expected to be close to the ground state of the classical Ising model that corresponds to the solution to the original computational problem 258. An experimental demonstration of the success of quantum annealing for random magnets was reported immediately after the initial theoretical proposal.

The final state 272 of the quantum computer 252 is measured, thereby producing results 276 (i.e., measurements) (FIG. 2B, operation 274). The measurement operation 274 may be performed, for example, in any of the ways disclosed herein, such as in any of the ways disclosed herein in connection with the measurement unit 110 in FIG. 1. The classical computer 254 performs postprocessing on the measurement results 276 to produce output 280 representing a solution to the original computational problem 258 (FIG. 2B, operation 278).

As yet another alternative example, embodiments of the present invention may be implemented, in whole or in part, using a quantum computer that is implemented using a one-way quantum computing architecture, also referred to as a measurement-based quantum computing architecture, which is another alternative to the gate model quantum computing architecture. More specifically, the one-way or measurement based quantum computer (MBQC) is a method of quantum computing that first prepares an entangled resource state, usually a cluster state or graph state, then performs single qubit measurements on it. It is "one-way" because the resource state is destroyed by the measurements.

The outcome of each individual measurement is random, but they are related in such a way that the computation always succeeds. In general, the choices of basis for later measurements need to depend on the results of earlier measurements, and hence the measurements cannot all be performed at the same time.

Any of the functions disclosed herein may be implemented using means for performing those functions. Such means include, but are not limited to, any of the components disclosed herein, such as the computer-related components described below.

Figure 1:
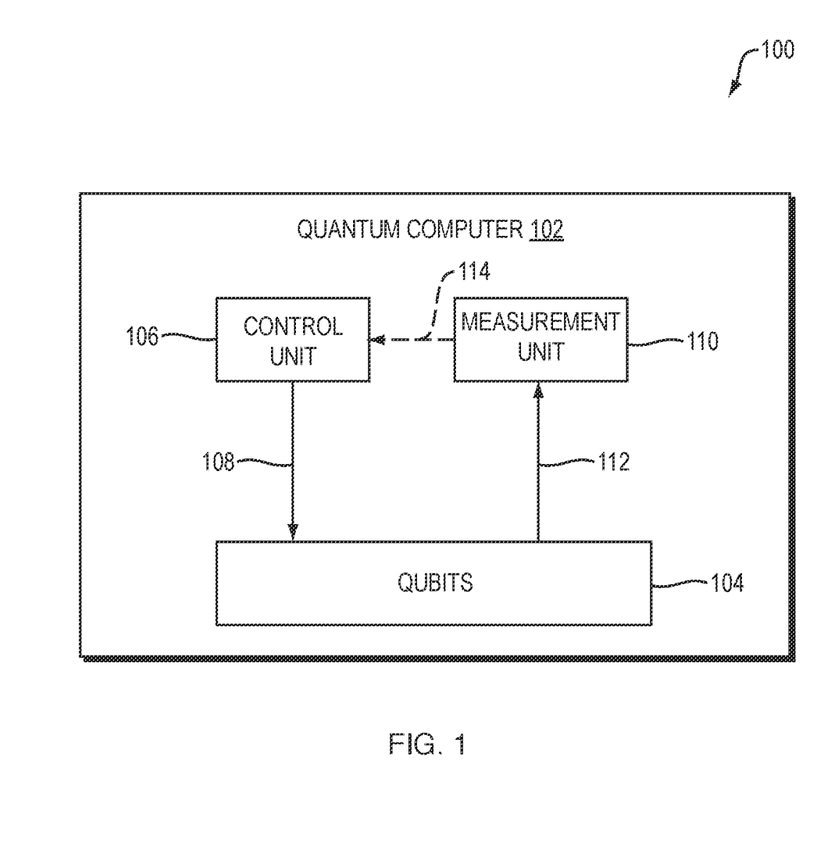
FIG. 1 is a diagram of a system implemented according to one embodiment of the present invention.

Referring to FIG. 1, a diagram is shown of a system 100 implemented according to one embodiment of the present invention. Referring to FIG. 2A, a flowchart is shown of a method 200 performed by the system 100 of FIG. 1 according to one embodiment of the present invention. The system 100 includes a quantum computer 102. The quantum computer 102 includes a plurality of qubits 104, which may be implemented in any of the ways disclosed herein. There may be any number of qubits 104 in the quantum computer 102. For example, the qubits 104 may include or consist of no more than 2 qubits, no more than 4 qubits, no more than 8 qubits, no more than 16 qubits, no more than 32 qubits, no more than 64 qubits, no more than 128 qubits, no more than 256 qubits, no more than 512 qubits, no more than 1024 qubits, no more than 2048 qubits, no more than 4096 qubits, or no more than 8192 qubits. These are merely examples, in practice there may be any number of qubits 104 in the quantum computer 102.

There may be any number of gates in a quantum circuit. However, in some embodiments the number of gates may be at least proportional to the number of qubits 104 in the quantum computer 102. In some embodiments, the gate depth may be no greater than the number of qubits 104 in the quantum computer 102, or no greater than some linear multiple of the number of qubits 104 in the quantum computer 102 (e.g., 2, 3, 4, 5, 6, or 7).

The qubits 104 may be interconnected in any graph pattern. For example, they be connected in a linear chain, a two-dimensional grid, an all-to-all connection, any combination thereof, or any subgraph of any of the preceding.

As will become clear from the description below, although element 102 is referred to herein as a "quantum computer," this does not imply that all components of the quantum computer 102 leverage quantum phenomena. One or more components of the quantum computer 102 may, for example, be classical (i.e., non-quantum components) components which do not leverage quantum phenomena.

The quantum computer 102 includes a control unit 106, which may include any of a variety of circuitry and/or other machinery for performing the functions disclosed herein. The control unit 106 may, for example, consist entirely of classical components. The control unit 106 generates and provides as output one or more control signals 108 to the qubits 104. The control signals 108 may take any of a variety of forms, such as any kind of electromagnetic signals, such as electrical signals, magnetic signals, optical signals (e.g., laser pulses), or any combination thereof.

For example:

In embodiments in which some or all of the qubits 104 are implemented as photons (also referred to as a "quantum optical" implementation) that travel along waveguides, the control unit 106 may be a beam splitter (e.g., a heater or a mirror), the control signals 108 may be signals that control the heater or the rotation of the mirror, the measurement unit 110 may be a photodetector, and the measurement signals 112 may be photons.

In embodiments in which some or all of the qubits 104 are implemented as charge type qubits (e.g., transmon, X-mon, G-mon) or flux-type qubits (e.g., flux qubits, capacitively shunted flux qubits) (also referred to as a "circuit quantum electrodynamic" (circuit QED) implementation), the control unit 106 may be a bus resonator activated by a drive, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as superconducting circuits, the control unit 106 may be a circuit QED-assisted control unit or a direct capacitive coupling control unit or an inductive capacitive coupling control unit, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as trapped ions (e.g., electronic states of, e.g., magnesium ions), the control unit 106 may be a laser, the control signals 108 may be laser pulses, the measurement unit 110 may be a laser and either a CCD or a photodetector (e.g., a photomultiplier tube), and the measurement signals 112 may be photons.

In embodiments in which some or all of the qubits 104 are implemented using nuclear magnetic resonance (NMR) (in which case the qubits may be molecules, e.g., in liquid or solid form), the control unit 106 may be a radio frequency (RF) antenna, the control signals 108 may be RF fields emitted by the RF antenna, the measurement unit 110 may be another RF antenna, and the measurement signals 112 may be RF fields measured by the second RF antenna.

In embodiments in which some or all of the qubits 104 are implemented as nitrogen-vacancy centers (NV centers), the control unit 106 may, for example, be a laser, a microwave antenna, or a coil, the control signals 108 may be visible light, a microwave signal, or a constant electromagnetic field, the measurement unit 110 may be a photodetector, and the measurement signals 112 may be photons.

In embodiments in which some or all of the qubits 104 are implemented as two-dimensional quasiparticles called "anyons" (also referred to as a "topological quantum computer" implementation), the control unit 106 may be nanowires, the control signals 108 may be local electrical fields or microwave pulses, the measurement unit 110 may be superconducting circuits, and the measurement signals 112 may be voltages.

In embodiments in which some or all of the qubits 104 are implemented as semiconducting material (e.g., nanowires), the control unit 106 may be microfabricated gates, the control signals 108 may be RF or microwave signals, the measurement unit 110 may be microfabricated gates, and the measurement signals 112 may be RF or microwave signals.

Although not shown explicitly in FIG. 1 and not required, the measurement unit 110 may provide one or more feedback signals 114 to the control unit 106 based on the measurement signals 112. For example, quantum computers referred to as "one-way quantum computers" or "measurement-based quantum computers" utilize such feedback signal 114 from the measurement unit 110 to the control unit 106. Such feedback signal 114 is also necessary for the operation of fault-tolerant quantum computing and error correction.

The control signals 108 may, for example, include one or more state preparation signals which, when received by the qubits 104, cause some or all of the qubits 104 to change their states. Such state preparation signals constitute a quantum circuit also referred to as an "ansatz circuit." The resulting state of the qubits 104 is referred to herein as an "initial state" or an "ansatz state." The process of outputting the state preparation signal(s) to cause the qubits 104 to be in their initial state is referred to herein as "state preparation" (FIG. 2A, section 206). A special case of state preparation is "initialization," also referred to as a "reset operation," in which the initial state is one in which some or all of the qubits 104 are in the "zero" state i.e. the default single-qubit state. More generally, state preparation may involve using the state preparation signals to cause some or all of the qubits 104 to be in any distribution of desired states. In some embodiments, the control unit 106 may first perform initialization on the qubits 104 and then perform preparation on the qubits 104, by first outputting a first set of state preparation signals to initialize the qubits 104, and by then outputting a second set of state preparation signals to put the qubits 104 partially or entirely into non-zero states.

Another example of control signals 108 that may be output by the control unit 106 and received by the qubits 104 are gate control signals. The control unit 106 may output such gate control signals, thereby applying one or more gates to the qubits 104. Applying a gate to one or more qubits causes the set of qubits to undergo a physical state change which embodies a corresponding logical gate operation (e.g., single-qubit rotation, two-qubit entangling gate or multi-qubit operation) specified by the received gate control signal. As this implies, in response to receiving the gate control signals, the qubits 104 undergo physical transformations which cause the qubits 104 to change state in such a way that the states of the qubits 104, when measured (see below), represent the results of performing logical gate operations specified by the gate control signals. The term "quantum gate," as used herein, refers to the application of a gate control signal to one or more qubits to cause those qubits to undergo the physical transformations described above and thereby to implement a logical gate operation.

It should be understood that the dividing line between state preparation (and the corresponding state preparation signals) and the application of gates (and the corresponding gate control signals) may be chosen arbitrarily. For example, some or all the components and operations that are illustrated in FIGS. W and X as elements of "state preparation" may instead be characterized as elements of gate application. Conversely, for example, some or all of the components and operations that are illustrated in FIGS. W and X as elements of "gate application" may instead be characterized as elements of state preparation. As one particular example, the system and method of FIGS. W and X may be characterized as solely performing state preparation followed by measurement, without any gate application, where the elements that are described herein as being part of gate application are instead considered to be part of state preparation. Conversely, for example, the system and method of FIGS. W and X may be characterized as solely performing gate application followed by measurement, without any state preparation, and where the elements that are described herein as being part of state preparation are instead considered to be part of gate application.

The quantum computer 102 also includes a measurement unit 110, which performs one or more measurement operations on the qubits 104 to read out measurement signals 112 (also referred to herein as "measurement results") from the qubits 104, where the measurement results 112 are signals representing the states of some or all of the qubits 104. In practice, the control unit 106 and the measurement unit 110 may be entirely distinct from each other, or contain some components in common with each other, or be implemented using a single unit (i.e., a single unit may implement both the control unit 106 and the measurement unit 110). For example, a laser unit may be used both to generate the control signals 108 and to provide stimulus (e.g., one or more laser beams) to the qubits 104 to cause the measurement signals 112 to be generated.

In general, the quantum computer 102 may perform various operations described above any number of times. For example, the control unit 106 may generate one or more control signals 108, thereby causing the qubits 104 to perform one or more quantum gate operations. The measurement unit 110 may then perform one or more measurement operations on the qubits 104 to read out a set of one or more measurement signals 112. The measurement unit 110 may repeat such measurement operations on the qubits 104 before the control unit 106 generates additional control signals 108, thereby causing the measurement unit 110 to read out additional measurement signals 112 resulting from the same gate operations that were performed before reading out the previous measurement signals 112. The measurement unit 110 may repeat this process any number of times to generate any number of measurement signals 112 corresponding to the same gate operations. The quantum computer 102 may then aggregate such multiple measurements of the same gate operations in any of a variety of ways.

After the measurement unit 110 has performed one or more measurement operations on the qubits 104 after they have performed one set of gate operations, the control unit 106 may generate one or more additional control signals 108, which may differ from the previous control signals 108, thereby causing the qubits 104 to perform one or more additional quantum gate operations, which may differ from the previous set of quantum gate operations. The process described above may then be repeated, with the measurement unit 110 performing one or more measurement operations on the qubits 104 in their new states (resulting from the most recently-performed gate operations).

In general, the system 100 may implement a plurality of quantum circuits as follows. For each quantum circuit C in the plurality of quantum circuits (FIG. 2A, operation 202), the system 100 performs a plurality of "shots" on the qubits 104. The meaning of a shot will become clear from the description that follows. For each shot S in the plurality of shots (FIG. 2A, operation 204), the system 100 prepares the state of the qubits 104 (FIG. 2A, section 206). More specifically, for each quantum gate G in quantum circuit C (FIG. 2A, operation 210), the system 100 applies quantum gate G to the qubits 104 (FIG. 2A, operations 212 and 214).

Then, for each of the qubits Q 104 (FIG. 2A, operation 216), the system 100 measures the qubit Q to produce measurement output representing a current state of qubit Q (FIG. 2A, operations 218 and 220).

The operations described above are repeated for each shot S (FIG. 2A, operation 222), and circuit C (FIG. 2A, operation 224). As the description above implies, a single "shot" involves preparing the state of the qubits 104 and applying all of the quantum gates in a circuit to the qubits 104 and then measuring the states of the qubits 104; and the system 100 may perform multiple shots for one or more circuits.

Referring to FIG. 3, a diagram is shown of a Hybrid quantum-classical (HQC) computer 300 implemented according to one embodiment of the present invention. The HQC 300 includes a quantum computer component 102 (which may, for example, be implemented in the manner shown and described in connection with FIG. 1) and a classical computer component 304. The classical computer component may be a machine implemented according to the general computing model established by John Von Neumann, in which programs are written in the form of ordered lists of instructions and stored within a classical (e.g., digital) memory 310 and executed by a classical (e.g., digital) processor 308 of the classical computer. The memory 310 is classical in the sense that it stores data in a storage medium in the form of bits, which have a single definite binary state at any point in time. The bits stored in the memory 310 may, for example, represent a computer program. The classical computer component 304 typically includes a bus 314. The processor 308 may read bits from and write bits to the memory 310 over the bus 314. For example, the processor 308 may read instructions from the computer program in the memory 310, and may optionally receive input data 316 from a source external to the computer 302, such as from a user input device such as a mouse, keyboard, or any other input device. The processor 308 may use instructions that have been read from the memory 310 to perform computations on data read from the memory 310 and/or the input 316, and generate output from those instructions. The processor 308 may store that output back into the memory 310 and/or provide the output externally as output data 318 via an output device, such as a monitor, speaker, or network device.

The quantum computer component 102 may include a plurality of qubits 104, as described above in connection with FIG. 1. A single qubit may represent a one, a zero, or any quantum superposition of those two qubit states. The classical computer component 304 may provide classical state preparation signals 332 to the quantum computer 102, in response to which the quantum computer 102 may prepare the states of the qubits 104 in any of the ways disclosed herein, such as in any of the ways disclosed in connection with FIGS. 1 and 2A-2B.

Once the qubits 104 have been prepared, the classical processor 308 may provide classical control signals 334 to the quantum computer 102, in response to which the quantum computer 102 may apply the gate operations specified by the control signals 108 to the qubits 104, as a result of which the qubits 104 arrive at a final state. The measurement unit 110 in the quantum computer 102 (which may be implemented as described above in connection with FIGS. W and X) may measure the states of the qubits 104 and produce measurement output 338 representing the collapse of the states of the qubits 104 into one of their eigenstates. As a result, the measurement output 338 includes or consists of bits and therefore represents a classical state. The quantum computer 102 provides the measurement output 338 to the classical processor 308. The classical processor 308 may store data representing the measurement output 338 and/or data derived therefrom in the classical memory 310.

The steps described above may be repeated any number of times, with what is described above as the final state of the qubits 104 serving as the initial state of the next iteration. In this way, the classical computer 304 and the quantum computer 102 may cooperate as co-processors to perform joint computations as a single computer system.

Although certain functions may be described herein as being performed by a classical computer and other functions may be described herein as being performed by a quantum computer, these are merely examples and do not constitute limitations of the present invention. A subset of the functions which are disclosed herein as being performed by a quantum computer may instead be performed by a classical computer. For example, a classical computer may execute functionality for emulating a quantum computer and provide a subset of the functionality described herein, albeit with functionality limited by the exponential scaling of the simulation. Functions which are disclosed herein as being performed by a classical computer may instead be performed by a quantum computer.

The techniques described above may be implemented, for example, in hardware, in one or more computer programs tangibly stored on one or more computer-readable media, firmware, or any combination thereof, such as solely on a quantum computer, solely on a classical computer, or on a Hybrid quantum-classical (HQC) computer. The techniques disclosed herein may, for example, be implemented solely on a classical computer, in which the classical computer emulates the quantum computer functions disclosed herein.

The techniques described above may be implemented in one or more computer programs executing on (or executable by) a programmable computer (such as a classical computer, a quantum computer, or an HQC) including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, tuning a quantum evolution, as performed by embodiments of the present invention, is not possible for a human to perform mentally or manually.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

In embodiments in which a classical computing component executes a computer program providing any subset of the functionality within the scope of the claims below, the computer program may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor, which may be either a classical processor or a quantum processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random-access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A classical computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium (such as a classical computer-readable medium, a quantum computer-readable medium, or an HQC computer-readable medium). Embodiments of the invention may store such data in such data structure(s) and read such data from such data structure(s).

What is claimed is:

1. A method for reducing, on a hybrid quantum-classical computer, a number of non-trivial operations in a tunable quantum evolution to produce an improved tunable quantum evolution, the tunable quantum evolution being capable of being evaluated with respect to an objective function, the method comprising:
    (A) selecting, on a classical computer, a subset S of a first set P of parameters whose values describe tunable components of the tunable quantum evolution;
    (B) reducing, on the classical computer, the number of non-trivial operations in the tunable quantum evolution based on a subset $P_d$ in the first set P of parameters that are not in the subset S, wherein $P_d$ is a complement of S with respect to P; and
    (C) tuning, on a quantum computer, the subset S of the first set P of parameters with respect to the objective function, thereby producing the improved tunable quantum evolution, the improved tunable quantum evolution comprising a set of tuned values of the subset S which, when the objective function is evaluated with respect to the set of tuned values of the subset S, produces a tuned value of the objective function.

2. The method of claim 1, wherein (B) comprises assigning, to each of the parameters in the subset $P_d$, a value such that the parameters in the subset $P_d$ correspond to trivial operations.

3. The method of claim 1, wherein (B) comprises setting values of each of the parameters in the subset $P_d$ to zero.

4. The method of claim 1, wherein (B) comprises removing, from a quantum annealing process, a step associated with the subset $P_d$ from an annealing schedule.

5. The method of claim 1, further comprising adding a new parameter to the subset S before (C).

6. The method of claim 5, wherein adding the new parameter comprises adding the new parameter from the first set P of parameters.

7. The method of claim 5, further comprising iteratively performing (A)-(C) in a plurality of iterations, with each of a plurality of subsets of P acting as the subset S in a sequence until a desired constraint on the objective function is achieved.

8. The method of claim 1, further comprising iteratively performing (A)-(C) in a plurality of iterations, with each of a plurality of subsets of P acting as the subset S in a sequence until a desired constraint on the objective function is achieved.

9. The method of claim 8, wherein the number of parameters of each of the plurality of subsets of P is equal across all iterations.

10. The method of claim 8, wherein each of the plurality of iterations in the sequence results in a corresponding tuned value $V_n$ of the objective function, and wherein the tuned value $V_n$ is input into iteration $V_{n+1}$ of (A)-(C).

11. The method of claim 8, wherein tuned values of the plurality of subsets of P are input into subsequent iterations.

12. The method of claim 1, wherein the number of parameters of the subset S is chosen according to a given fraction of the number of parameters in the first set P of parameters.

13. The method of claim 1, wherein the tuning constitutes simulated annealing based on the objective function.

14. The method of claim 1, wherein selecting the subset S comprises selecting parameters in a layer of a layered circuit ansatz.

15. The method of claim 1, further comprising:
   (D) evaluating the objective function with respect to the set of tuned values of the subset S to produce the tuned value of the objective function.

16. A system for reducing, on a hybrid quantum-classical computer, a number of non-trivial operations in a tunable quantum evolution to produce an improved tunable quantum evolution, the tunable quantum evolution being capable of being evaluated with respect to an objective function, the system comprising a non-transitory computer-readable medium having computer program instructions stored thereon, the hybrid quantum-classical computer including a classical computer and a quantum computer, the computer program instructions being executable by at least one processor in the classical computer to perform a method, the method comprising:
   (A) selecting, on the classical computer, a subset S of a first set P of parameters whose values describe tunable components of the tunable quantum evolution;
   (B) reducing, on the classical computer, the number of non-trivial operations in the tunable quantum evolution based on a subset $P_d$ in the first set P of parameters that are not in the subset S, wherein $P_d$ is a complement of S with respect to P; and
   (C) controlling the quantum computer to tune, on the quantum computer, the subset S of the first set P of parameters with respect to the objective function, thereby producing the improved tunable quantum evolution, the improved tunable quantum evolution comprising a set of tuned values of the subset S which, when the objective function is evaluated with respect to the set of tuned values of the subset S, produces a tuned value of the objective function.

17. The system of claim 16, wherein (B) comprises assigning, to each of the parameters in the subset $P_d$, a value such that the parameters in the subset $P_d$ correspond to trivial operations.

18. The system of claim 16, wherein (B) comprises setting values of each of the parameters in the subset $P_d$ to zero.

19. The system of claim 16, wherein (B) comprises removing, from a quantum annealing process, a step associated with the subset $P_d$ from an annealing schedule.

20. The system of claim 16, wherein the method further comprises adding a new parameter to the subset S before (C).

21. The system of claim 20, wherein adding the new parameter comprises adding the new parameter from the first set P of parameters.

22. The system of claim 20, further comprising iteratively performing (A)-(C) in a plurality of iterations, with each of a plurality of subsets of P acting as the subset S in a sequence until a desired constraint on the objective function is achieved.

23. The system of claim 16, further comprising iteratively performing (A)-(C) in a plurality of iterations, with each of a plurality of subsets of P acting as the subset S in a sequence until a desired constraint on the objective function is achieved.

24. The system of claim 23, wherein the number of parameters of each of the plurality of subsets of P is equal across all iterations.

25. The system of claim 23, wherein each of the plurality of iterations in the sequence results in a corresponding tuned value $V_n$ of the objective function, and wherein the tuned value $V_n$ is input into iteration $V_{n+1}$ of (A)-(C).

26. The system of claim 23, wherein tuned values of the plurality of subsets of P are input into subsequent iterations.

27. The system of claim 16, wherein the number of parameters of the subset S is chosen according to a given fraction of the number of parameters in the first set P of parameters.

28. The system of claim 16, wherein the tuning constitutes simulated annealing based on the objective function.

29. The system of claim 16, wherein selecting the subset S comprises selecting parameters in a layer of a layered circuit ansatz.

30. The system of claim 16, wherein the method further comprises:
   (D) evaluating the objective function with respect to the set of tuned values of the subset S to produce the tuned value of the objective function.

* * * * *